UNITED STATES PATENT OFFICE.

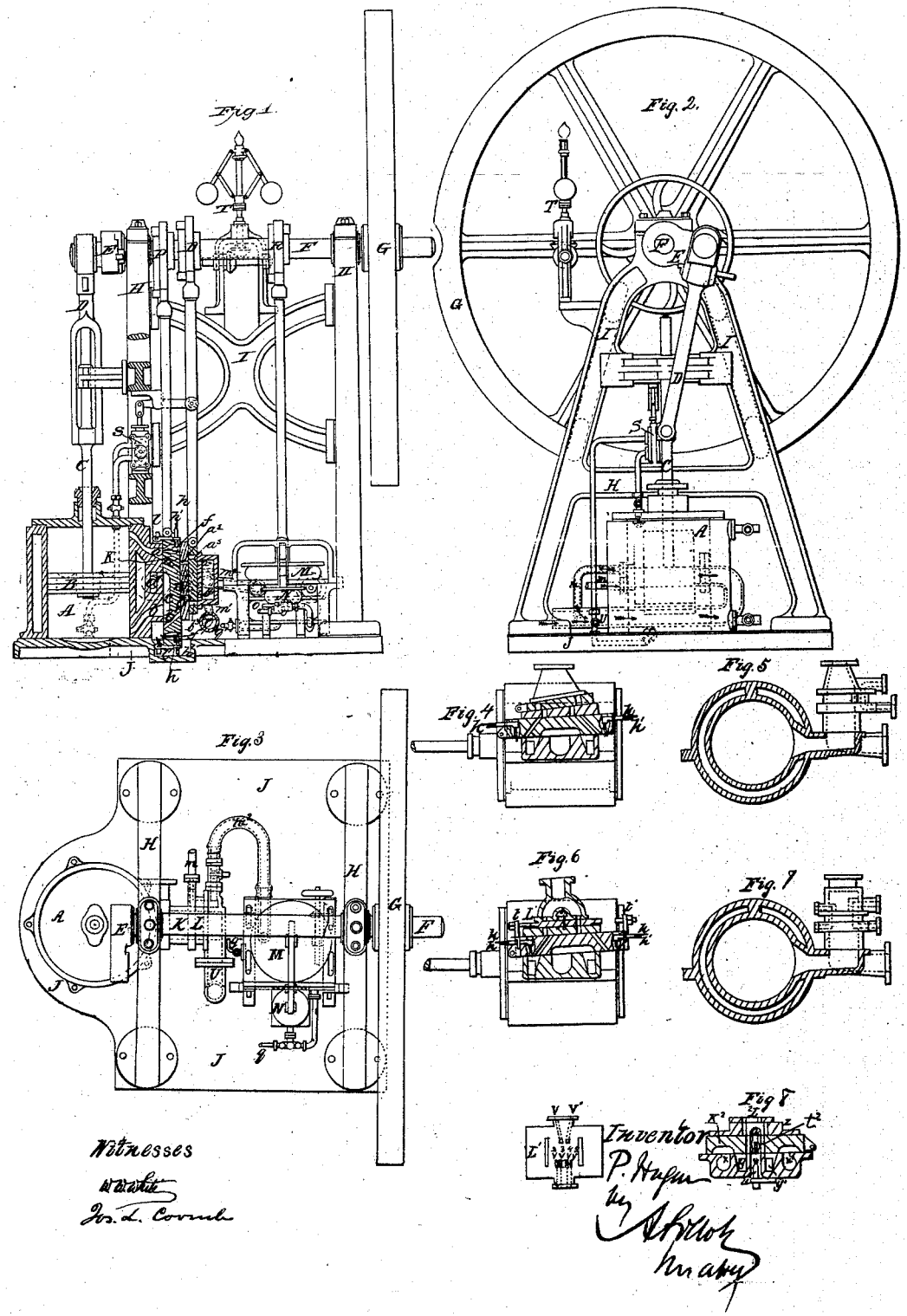

PIERRE HUGON, OF PARIS, FRANCE, ASSIGNOR TO EMIL JUSTH.

IMPROVEMENT IN GAS-ENGINES.

Specification forming part of Letters Patent No. 49,346, dated August 8, 1865.

*To all whom it may concern:*

Be it known that I, PIERRE HUGON, of Paris, in the Empire of France, have invented certain new and useful Improvements in Gas-Engines; and I hereby declare that the following is a full, clear, and exact description of the same.

The improvement subject of this patent relates to that class of gas-engines for which Letters Patent of the United States were issued to me on the 19th day of January, 1864. Numerous experiments and a most careful study of them have demonstrated that engines operated by the direct action of the detonating or explosive gases in accordance with the description annexed to the said patent failed to give satisfactory results in an industrial point of view, and I have ascertained that the employment of electricity to ignite or explode the gases or gaseous compound is inadequate to produce that regularity and precision and safety of action which have been attained in steam-engines. In fact I have ascertained that, whatever may be the perfection of the apparatus and the care with which the same is maintained in operative condition, there are nevertheless inexplicable and unexpected interruptions which now and then interfere with the production of the electric spark, resulting in stoppages of the engine which are incompatible with the regularity and uniformity of action of motive power necessary for industrial or manufacturing purposes. It was therefore my object to remedy this evil and to produce a direct-acting gas-engine, and I have accomplished the same by the construction and arrangement of gas-engine shown in the following description and in the annexed drawings, in which—

Figure 1 is an elevation, partly in section; Fig. 2, a side and Fig. 3 a plan view of an upright engine constructed in accordance with tl is my invention. Figs. 4, 5, 6, and 7 show the arrangement of two kinds of slide-valves which may be used for horizontal engines, and Fig. 8 is another system of valves with one lighting and one igniting burner.

In the said figures, A is the motive-cylinder; B, the piston; C, the piston-rod; D, the connecting-rod; E, the crank; F, the main shaft; G, the fly-wheel; H, the frame, which is rendered rigid by means of braces I, and is firmly established upon a base or foundation plate, J.

K is the induction, inflammatory, and escape valve.

L is the valve for the distribution of the gas or detonating compound and for the injection of water.

M is a blower or gas-pump, applied for the purpose of forming the detonating-mixture.

N is the blower or pump used to give the gas the necessary or requisite pressure at the lighting and inflammatory or igniting burners.

O is the gas-reservoir for supplying the lighting and igniting or imflammatory burners.

P, Q, and R are the cams which operate the slide-valves K L S.

S is the injecting-valve.

T is the governor, whose function it is to close the tube through which gas is introduced into the mixture, and this is effected through the intermediary of a cock or any other mechanical means known.

U is the tube within which the mixture of air and gas is produced.

$ff$ are the inflammatory or igniting burners, carrying two small pipes.

$h\ h'$ are pipes through which the gas and the air necessary for the combustion are introduced.

$l\ l'$ are the lighting-burners to the inflammatory or igniting burners.

$m\ m'$ are the orifices or tubes through which the suction or introduction of the gas into the mixture is effected.

$m^2$ is the gas-suction and checking pipe.

$q\ q'$ are the inducts and educts of the gas for the lighting and igniting burners.

Figs. 4 and 5 are views of a horizontal cylinder in which the valves are identically the same as those in the engine represented in Figs. 1, 2, and 3.

Figs. 6 and 7 represent a cylinder the valve $L'$ of which is arranged to both distribute the gas-mixture and to inject the water.

$V\ V'$ are the openings through which the water is injected. $V^2\ V^3\ V^4\ V^5$ are the openings through which the gas is introduced.

$t\ t'$ are tappets for imparting the necessary movement to the valves.

As to Fig. 8, $K^2$ is a valve provided with but one igniting-burner, $t^2$, and with but one lighting-burner, $u$, the exhaust in this case taking place at the two extremities, $x\ x'$, while the induction is through the orifices $y\ y'$. $a$ is a cavity within which air requisite for the combustion of the gas at the igniting-burner is allowed to circulate.

From the foregoing references it will already be understood that the essential feature of my invention consists in the substitution for the action of the ignition of the explosive gases by means of elasticity of the ignition under constant, permanent, and direct action regulated by means of one or more slide-valves.

The valve K serves the purpose of introducing into the cylinder the explosive compound, also of inflaming the compound, and of effecting the escape of the gaseous products of combustion.

When several slide-valves are used I prefer to place above the valve K another, L, the office of which is to produce suction or aspiration of the gas in the mixing-tube V and to distribute the detonating compound through the valve K; and I also effect, by the same means, the injection at given intervals of time of a certain quantity of water into the cylinder, the object and importance of which will be hereinafter explained.

The slide-valve L is operated by means of two tappets placed upon or attached to the slide-valve K, as seen in Fig. 6, or by means of the cam-rod P, as seen in Fig. 1.

The vertical engine represented in Figs. 1, 2, and 3 is composed of a cylinder, A, which is provided with a jacket for the circulation of water, of a metallic piston, B, piston-rod C, connecting-rod D, crank E, main shaft F, &c., as hereinafter referred to. Air pumps or blowers, (preferably made of rubber,) M N O, operated by the cams P Q R, constitute the main appurtenances. The cam Q may be suppressed and the slide-valve L' may be operated by tappets on the slide-valve K, as shown in Figs. 6 and 7. The slide-valve S may also be dispensed with, if desirable, in the manner shown in Figs. 6 and 7.

Such being the parts of the engine described in illustration of my invention, I shall now proceed to explain its operation.

In the first place the lighting-burners $l$ $l'$ and the igniting and inflammatory burners $f$ $f'$ are lighted. The piston B is then placed at either extremity of its stroke, and the engine is started by turning the fly-wheel by hand. The ports $a'$ $a^2$ $a^3$ $a^4$ of the valves K and L are thus placed in communication with the port $a$ of the cylinder at the same time the exhaust-chamber C of the slide-valve K is put in communication with the ports $b$ and $d$ of the cylinder. The piston B, in descending, is drawing in the detonating gaseous mixture, which is supplied by the rubber pump or blower M and the tube U, into which air is admitted, as shown in Figs. 1 and 2, by suction. The same movement of the piston causes the expulsion through the ports or orifices $b$ $c$ $d$ of the air and the gaseous products of combustion. When the piston is thus come to a certain point—say four-tenths of its stroke—the valve K is returned or slid back, whereby the communication with the ports or orifices $a'$ $a^2$ $a^3$ $a^4$ is closed. The inflammatory burner $f$ will then ignite the detonating-mixture contained in the upper part of the cylinder. As soon as the inflammation of the detonating-mixture is effected the piston is moved or forced down with a pressure varying according to the quality and quantity of gas contained in the mixture. When the piston is thus driven to the extremity of its course the operations described with regard to the downward stroke are now being repeated upon the return-stroke of the piston; but they are effected through the orifices or ports $b'$ $b^2$ $b^3$ $b^4$ and by the inflammatory or igniting burner $f'$. At each ignition of the gaseous compound the inflammatory or igniting burner is extinguished, because the gases remaining after detonation contain no oxygen to supply the inflammatory burner. It is, however, again lighted by the lighting-burner as soon as, by action of the engine, it is brought in contact with atmospheric air. The gas issuing at the burner is maintained under pressure, so that a powerful and permanent jet is produced, which insures regularity of action in the lighting and igniting.

After the engine is worked for some short time, and the circulation of water around the cylinder notwithstanding, the parts become excessively heated, which would necessitate frequent lubrication, and which in consequence would render the operation of this class of engines very expensive. To avoid this excessive heating, and to diminish lubrication, I have provided for the injection through the slide-valve S, in the form of a fine shower, and upon each face of the piston at the moment of the ignition of the detonating compound, of a small quantity of water, which is regulated at the pleasure of the operator, according to circumstances. The injection of water is effected on top and bottom of the cylinder by means of small injecting-pumps, which are at the extremities of water-supply pipes provided with cocks to regulate the quantity of water conveyed to the pumps. The water thus injected is instantaneously vaporized, and the steam is carried up to a high temperature. This steam, being added to the steam produced by the direct combination of gases attending the detonation of the compound in the cylinder, imparts to the engine a more regular action and prevents the grease or lubricating substance from being burned.

The slide-valves K L S, which are constructed and arranged for use in vertical engines, as shown in Figs. 1, 2, and 3, may be substituted by the valves K' L' and K² L² shown in Figs. 6, 7, and 8. The valve K' is precisely similar to the valve K; but the valve L' differs from the valve L in the disposition of its openings V V' V² V³ V⁴ V⁵. The two orifices V V' are used for the direct injection of the water without recourse to the valve S. To this effect the orifices are made transversely, as shown in the drawings, and are made to operate by the action of the valves themselves. The orifices V², V³, V⁴, and V⁵ are intended for the suction and ejection of the gas which is to mix with atmospheric air. The whole valve L' is put in motion by means of tappets mounted upon the valve K. The valve K² exhibited in Fig. 8 differs from the valves K and K' in this, that it carries but one inflammatory burner and but one lighting-burner.

The inflammation and ignition of the gases is effected through the center of valves instead of at the extremities thereof; otherwise the valve L² performs the same functions as the valve L'.

The part Z, which is placed between the two valves, contains a cavity, $a$, which allows of the circulation of air necessary for the combustion of the gas of the inflammatory burner.

The pressure of gas at the burner is regulated by means of the blowing apparatus O and a regulating-valve mounted upon the bellows or blowing apparatus N.

Having thus fully described my said invention and the manner in which the same is or may be carried into effect, I would observe that I do not confine myself to the precise construction and arrangement of engine or details as described in the foregoing specification, my invention being susceptible of many modifications without departure from the principle thereof; and

I claim as my invention—

1. The method herein described of igniting in gas-engines the gaseous detonating compound, in the manner and for the purpose hereinbefore set forth—that is to say, by the employment, in combination with one or more slide-valves, constructed for operation substantially as shown and described, of one or more lighting and inflammatory or igniting burners, whereby the use of electricity as the medium to ignite the said compound may be dispensed with.

2. In gas-engines—that is to say, in engines in which the motive power is a gaseous compound, to be ignited within the cylinder or in any vessel communicating therewith—the employment, in combination with the said gaseous compound, of water or other vaporizing-liquid, substantially in the manner and for the purposes hereinbefore set forth.

3. The arrangement, substantially as herein described, of the slide-valves for the distribution of the detonating-mixture and for the ignition thereof at given intervals of time, in combination with lighting and igniting burners, as set forth.

4. The arrangement and combination of parts for the distribution and injection of water around and into the cylinder, substantially as herein described, and for the purpose set forth.

5. The general arrangement and combination of gas-engines, substantially as hereinbefore described, and shown in the annexed drawings.

In testimony whereof I have signed my name to this specification before two subscribing witnesses.

P. HUGON.

Witnesses:
E. SHERMAN GOULD,
C. AMART.